United States Patent
Chang

(10) Patent No.: US 7,548,048 B2
(45) Date of Patent: Jun. 16, 2009

(54) SWITCHING MODE POWER SUPPLY AND METHOD FOR DETERMINING A COMPENSATION FACTOR THEREOF

(75) Inventor: Wei-Hsu Chang, Hsinchu (TW)

(73) Assignee: Richtek Technology Corp., Hsinchu (TW)

( * ) Notice: Subject to any disclaimer, the term of this patent is extended or adjusted under 35 U.S.C. 154(b) by 174 days.

(21) Appl. No.: 11/892,994

(22) Filed: Aug. 29, 2007

(65) Prior Publication Data
US 2008/0054869 A1    Mar. 6, 2008

(30) Foreign Application Priority Data
Sep. 1, 2006    (TW)    .............................. 95132473 A

(51) Int. Cl.
*G05F 1/575* (2006.01)
*G05F 1/618* (2006.01)

(52) U.S. Cl. ...................................... 323/283; 323/285

(58) Field of Classification Search ................. 323/224, 323/265, 282, 283, 284, 285, 351
See application file for complete search history.

(56) References Cited

U.S. PATENT DOCUMENTS

| 7,498,787 B2* | 3/2009 | Leung et al. ................ 323/283 |
| 2007/0108951 A1* | 5/2007 | Coleman .................... 323/282 |
| 2008/0186001 A1* | 8/2008 | Singh et al. ................ 323/234 |
| 2008/0303501 A1* | 12/2008 | Prodic ....................... 323/283 |

* cited by examiner

*Primary Examiner*—Gary L Laxton
(74) *Attorney, Agent, or Firm*—Rosenberg, Klein & Lee

(57) ABSTRACT

A switching mode power supply is configured to have two modes, a normal mode and a measure mode. To determine a compensation factor to compensate the switching mode power supply in the normal mode, the switching mode power supply is switched to the measure mode to measure a frequency response of the switching mode power supply, by which the switching mode power supply is accurately compensated and optimized.

21 Claims, 8 Drawing Sheets

SWITCHING MODE POWER SUPPLY AND METHOD FOR DETERMINING A COMPENSATION FACTOR THEREOF

FIELD OF THE INVENTION

The present invention is related generally to a switching mode power supply (SMPS) and, more particularly, to a compensator for a switching mode power supply.

BACKGROUND OF THE INVENTION

FIG. 1 shows a conventional digital non-isolated buck switching mode power supply 100, in which an output stage 102 converts an input voltage Vi to an output voltage Vo for a load 122, an error amplifier 110 compares the output voltage Vo with a reference voltage Vref to produce an error signal Ve, an analog-to-digital converter (ADC) 108 converts the analog error signal Ve to a digital error signal Ve', a compensator 106 receives and calculates the digital error signal Ve' to produce a digital signal Vd, and a digital pulse width modulator (DPWM) 104 produces a pulse width modulation signal pwm_o to drive the output stage 102 according to the digital signal Vd. In the output stage 102, two switches 114 and 118, for example power transistors, are coupled in series between the power input Vi and ground GND, two diodes 116 and 120 are shunt to the switches 114 and 118 respectively, a pulse width modulator (PWM) driver 112 switches the switches 114 and 118 according to the PWM signal pwm_o to produce an inductor current $I_L$ to charge a capacitor C to produce the output voltage Vo.

The compensator 106 is used to stabilize the switching mode power supply 100, and a good compensator 106 can make the switching mode power supply 100 have enough phase margin for loop stability, enough direct current (DC) gain to achieve error free, and larger bandwidth for quick response when the load 122 changes. On the contrary, a bad compensator 106 will decrease the efficiency of the switching mode power supply 100. For more details about analog compensators, it may refer to "Fundamentals of Power Electronics," Kluwer Academic Publishers, 2001, and for more details about digital compensators, it may refer to "Impact of Digital Control in Power Electronics," Proceeding of 2004 International Symposium on Power Semiconductor Devices & Ics, pp. 13-22, and "Designing a TMS320F280x Based Digitally Controlled DC-DC Switching Power Supply," Texas Instruments Application Report, July 2005.

However, the conventional compensator 106 is designed based on the mathematical model of the module provided by the given specification of the switching mode power supply, and the small signal model using an average state space method to approximate to a switching mode power supply, so the non-ideal effects of the elements in the switching mode power supply 100 can't be taken into consideration before designing the conventional compensator 106. For this reason, the design of the compensator 106 can't be optimized, and therefore the conventional compensator 106 can merely compensate the switching mode power supply 100 roughly for essentially ensuring that the switching mode power supply 100 can work stably. Even though the non-ideal effects of the elements will reflect on the transient or frequency response of the switching mode power supply 100, they could be measured only when the switching mode power supply 100 operates at stable state; in other words, the transient or frequency response of the conventional switching mode power supply 100 can't be measured before designing the compensator 106. Besides, even though the open-loop gain of the switching mode power supply 100 at stable state can be measured after designing the compensator 106 to provide the reference data for improving the compensator 106, the trial-and-error is needed to improve the bandwidth of the switching mode power supply 100, which is a labor job.

Therefore, it is desired a method for efficiently designing a good compensator for a digital switching mode power supply.

SUMMARY OF THE INVENTION

An object of the present invention is to provide a switching mode power supply and a method for determining a compensation factor thereof.

According to the present invention, a switching mode power supply operative in a normal mode and a measure mode comprises a controller for driving an output stage to produce an output voltage, wherein a compensation factor to compensate the switching mode power supply in the normal mode is determined by operating the switching mode power supply in the measure mode, especially by measuring a frequency response of the switching mode power supply in the measure mode.

In one embodiment, the controller comprises an error amplifier for comparing a feedback signal from a feedback pin with a reference voltage to produce an error signal, a first compensator having a first compensation factor for compensating the error signal to produce a first signal in the measure mode, a second compensator having a second compensation factor for compensating the error signal to produce a second signal in the normal mode, and a pulse width modulator for driving the output stage according to the first signal or the second signal.

In another embodiment, the controller comprises an error amplifier for comparing the output voltage with a reference voltage to produce an error signal, an alternative current (AC) signal generator for providing a small signal voltage, a first compensator having a first compensation factor for compensating the small signal voltage to produce a first signal in the measure mode, a second compensator having a second compensation factor for compensating the error signal to produce a second signal in the normal mode, a pulse width modulator for driving the output stage according to the first signal or the second signal, and an analyzer for analyzing the first signal and the small signal voltage in the measure mode to retrieve a frequency response for determining the second compensation factor.

In yet another embodiment, the controller comprises an error amplifier for comparing a feedback signal from a feedback pin with a reference voltage to produce an error signal, a compensator for compensating the error signal with a first compensation factor for the measure mode and compensating the error signal with a second compensation factor for the normal mode, and a pulse width modulator for driving the output stage according to the compensated error signal.

BRIEF DESCRIPTION OF DRAWINGS

These and other objects, features and advantages of the present invention will become apparent to those skilled in the art upon consideration of the following description of the preferred embodiments of the present invention taken in conjunction with the accompanying drawings, in which.

DETAILED DESCRIPTION OF THE INVENTION

Figure 1:
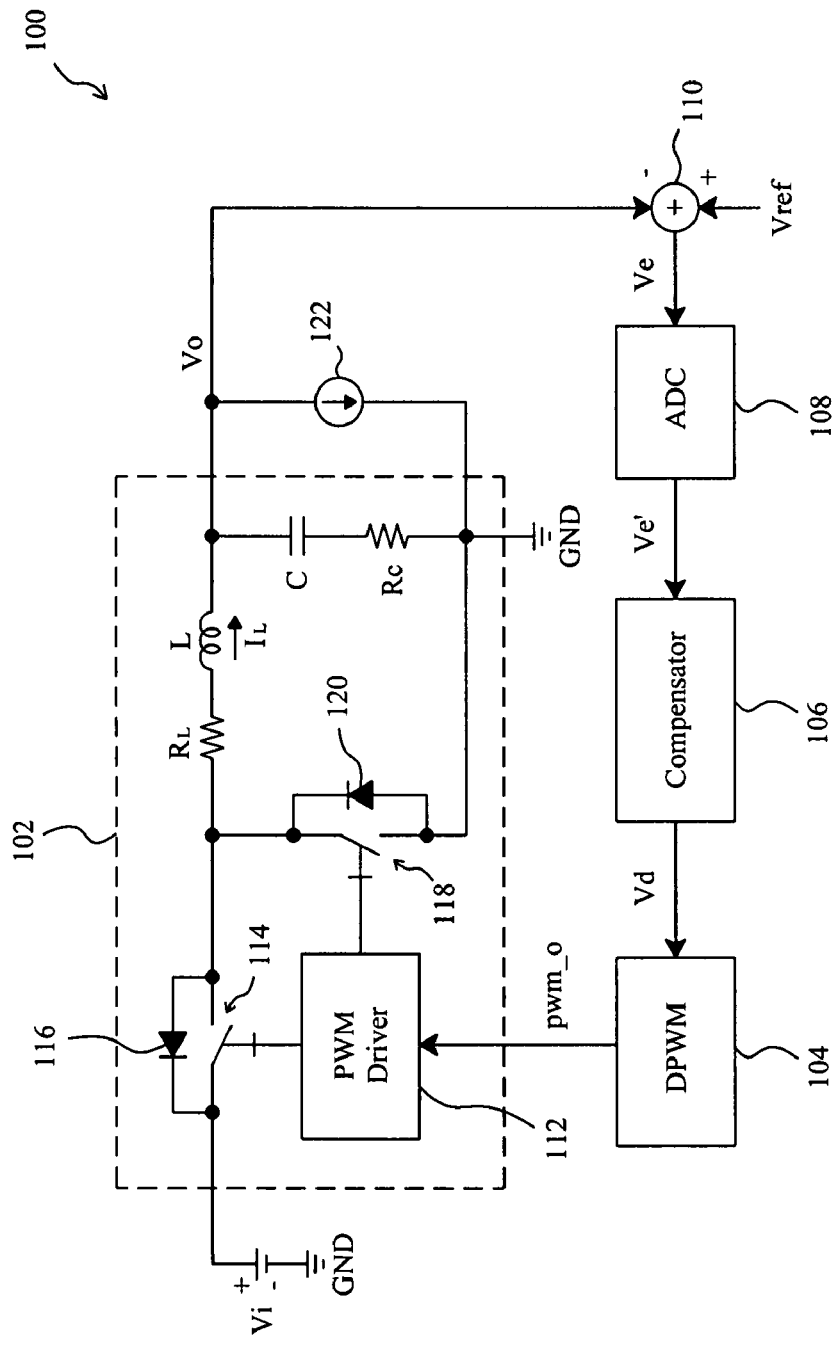
FIG. 1 shows a conventional digital switching mode power supply.
Figure 2:
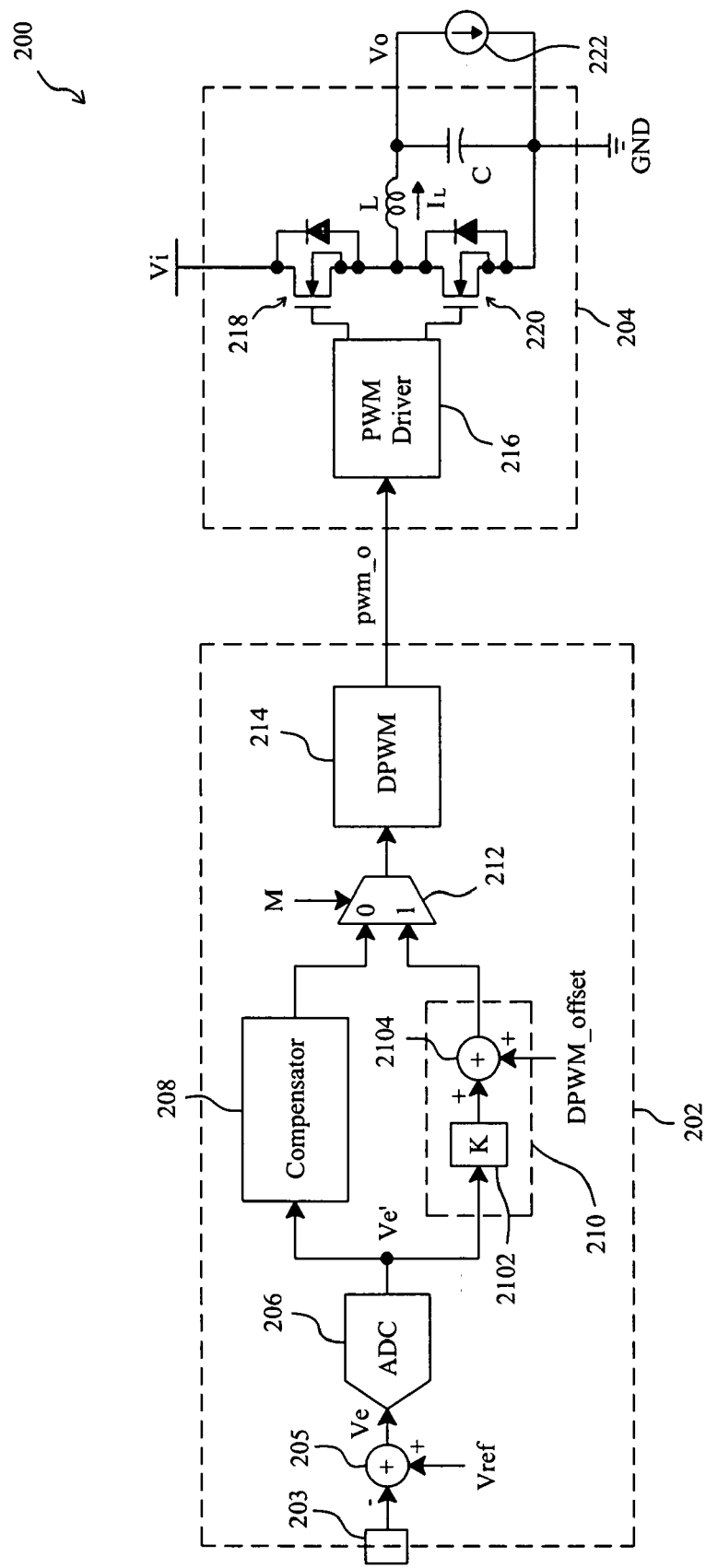
FIG. 2 shows a first embodiment according to the present invention.

FIG. 2 shows a first embodiment according to the present invention. In a digital switching mode power supply 200, a controller 202 drives an output stage 204 to convert an input voltage Vi to an output voltage Vo. In the controller 202, an error amplifier 205 has two inputs to receive a feedback signal from a feedback pin 203 and a reference voltage Vref respectively, and an output to provide an error signal for an ADC 206, two compensators 208 and 210 are connected in parallel between the ADC 206 and a multiplexer 212 to be selected to provide a compensated signal for a DPWM 214 according to a mode switching signal M. The compensator 210 comprises a single gain circuit 2102 and an adder 2104. In the output stage 204, a driver 216 is driven by the output of the DPWM 214 to switch two power transistors 218 and 222 coupled in series between the power input Vi and ground GND, for producing an inductor current $I_L$ flowing through an inductor L to charge a capacitor C to produce the output voltage Vo for a load 222.

Figure 3:
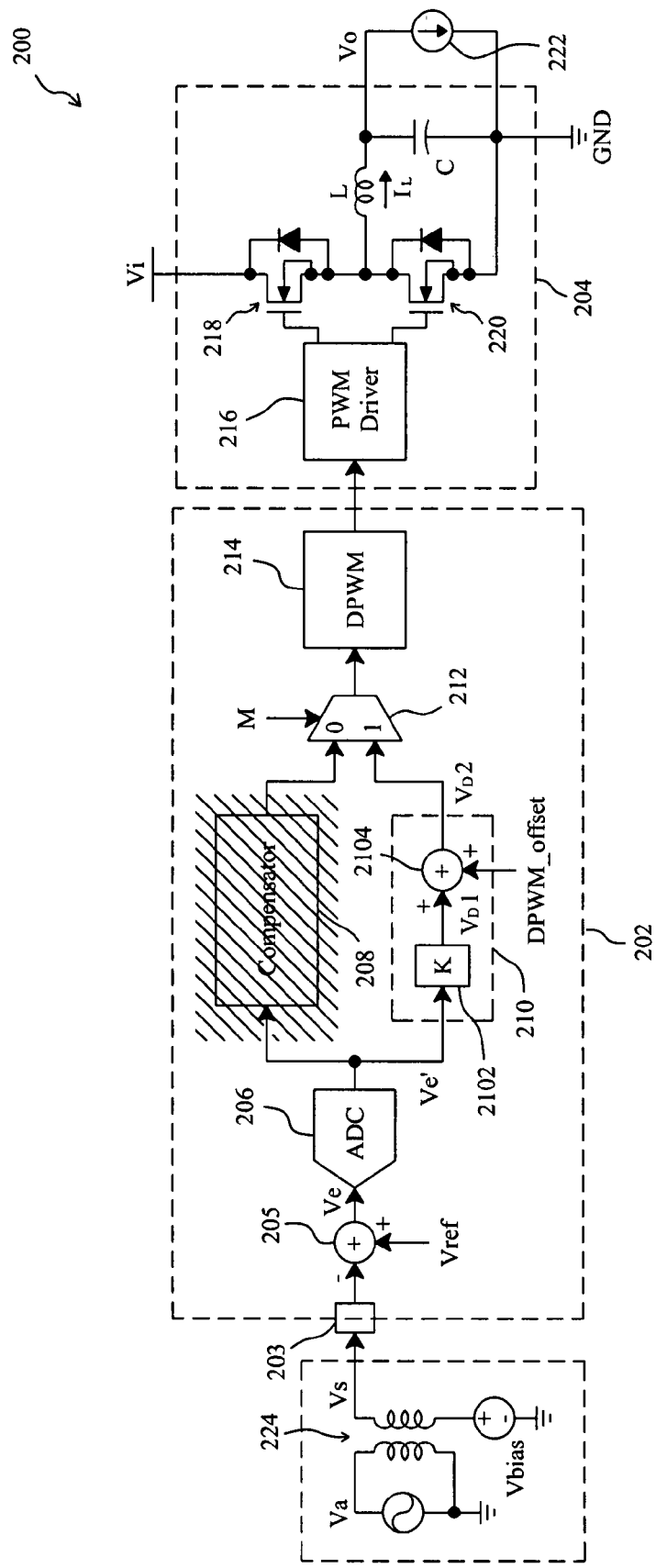
FIG. 3 schematically shows how the switching mode power supply of FIG. 2 operates in a measure mode.

In an embodiment, the controller 202 and output stage 204 are mounted on a printed circuits board (PCB), and then the switching mode power supply 200 is switched to a measure mode, in which being controlled by the mode switching signal M, the multiplexer 212 selects the compensator 210 to provide a compensated signal for the DPWM 214, and in this case, because it is an open circuit between the compensator 208 and the DPWM 214, the compensator 208 can be ignored, as shown in FIG. 3. In the measure mode, an external sine-wave signal voltage source Va is coupled to a DC voltage source Vbias (set Vbias=Vref) by a transformer 224, so as to provide a small signal voltage Vs to the feedback pin 203 of the controller 202, and the error amplifier 205 compares the small signal voltage Vs with the reference voltage Vref to produce an error signal Ve for the ADC 206. Because of Vbias=Vref, Ve=Va. The ADC 206 converts the error signal Ve to a digital error signal Ve', in the compensator 210 the signal gain circuit 2102 amplifies the digital error signal Ve' to be a digital signal $V_D1$, and the adder 2104 level-shifts the digital signal $V_D1$ with an offset signal DPWM_offset which is equal to Vo/Vi, to produce a digital signal $V_D2$, and the DPWM 214 drives the output stage 204 to produce the output voltage Vo according to the digital signal $V_D2$. The frequency of the external sine-wave signal voltage source Va is changed from low to high, for example from several Hz to several MHz, and the frequency response of the small signal model of the switching mode power supply 200 can be derived according to the small signal voltage Vs and the output voltage Vo, so as to determine an optimized compensation factor for the switching mode power supply 200, and to be stored in the compensator 208.

Figure 4:
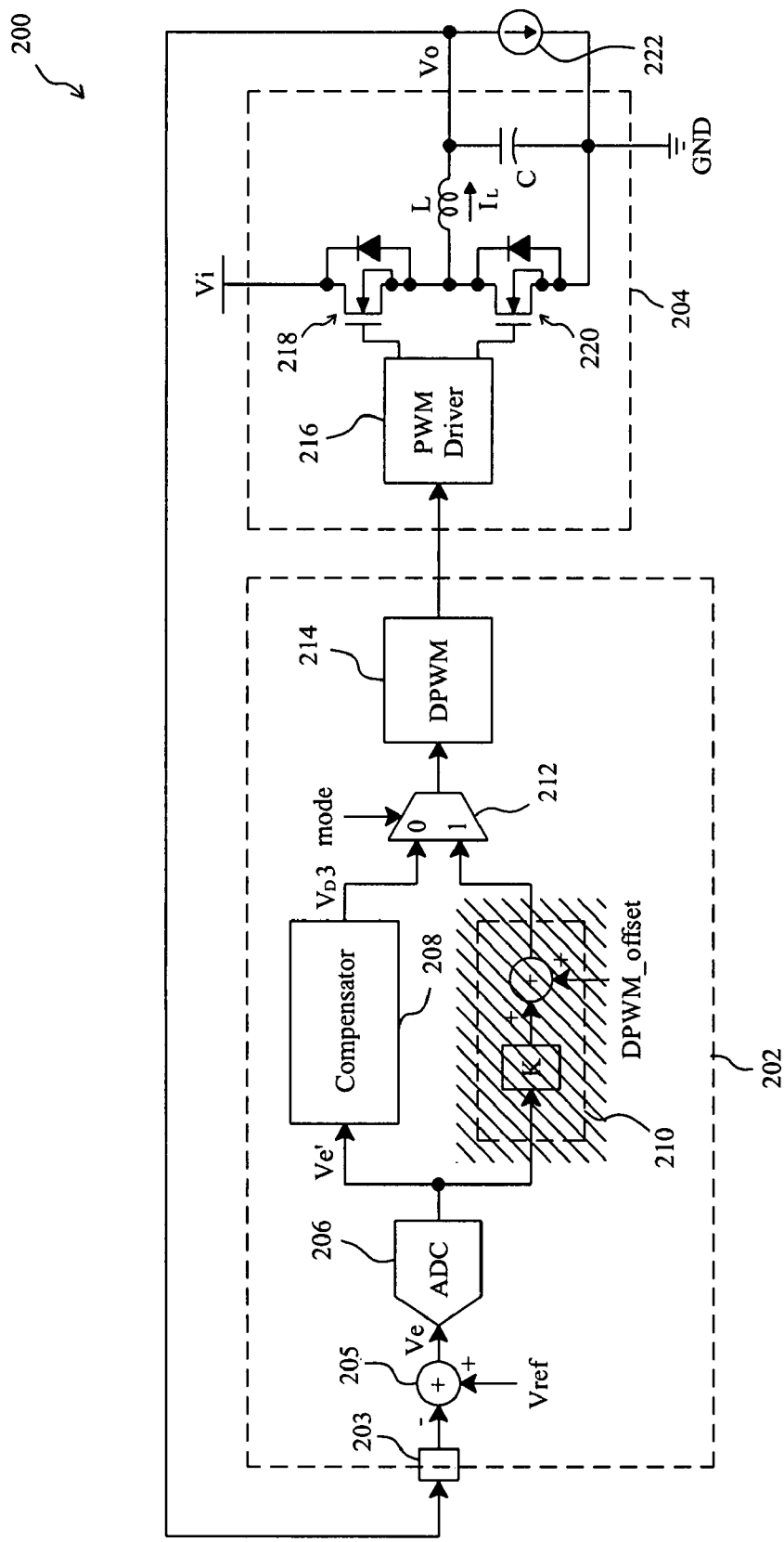
FIG. 4 schematically shows how the switching mode power supply of FIG. 2 operates in a normal mode.

After the compensator 208 is set with the optimized compensation factor resulted from the frequency response in the measure mode, the switching mode power supply 200 is switched to a normal mode, in which the multiplexer 212 selects the compensator 208 to provide a compensated signal for the DPWM 214 according to the mode switching signal M, the output voltage Vo produced by the output stage 204 is fed back to the feedback pin 203 of the controller 202, and the error amplifier 205 compares the output voltage Vo with the reference voltage Vref to produce the error signal Ve for the ADC 206. In this case, because it is an open circuit between the compensator 210 and the DPWM 214, the compensator 210 can be ignored, as shown in FIG. 4. In the normal mode, the ADC 206 converts the error signal Ve to a digital error signal Ve', the compensator 208 compensates the digital error signal Ve' to produce a digital signal $V_D3$, and the DPWM 214 drives the output stage 204 to produce the output voltage Vo according to the digital signal $V_D3$. Because the compensation factor of the compensator 208 is derived by actually measuring the frequency response of the switching mode power supply 200, the non-ideal effects of the elements in the switching mode power supply 200, such as the dead-time control of the driver 216, the on-resistance of the power transistors 218 and 212, the parasitic inductors, capacitors and resistors on the printed circuits board, the quantization and frequency response of the ADC 206, the calculation delay of the controller 202, and the quantization of the DPWM 214, can be all taken into consideration, and thereby be compensated accurately, which can optimize the switching mode power supply 200, such as for improving the response speed, minimizing the DC error, and enduring the external interference.

Figure 5:
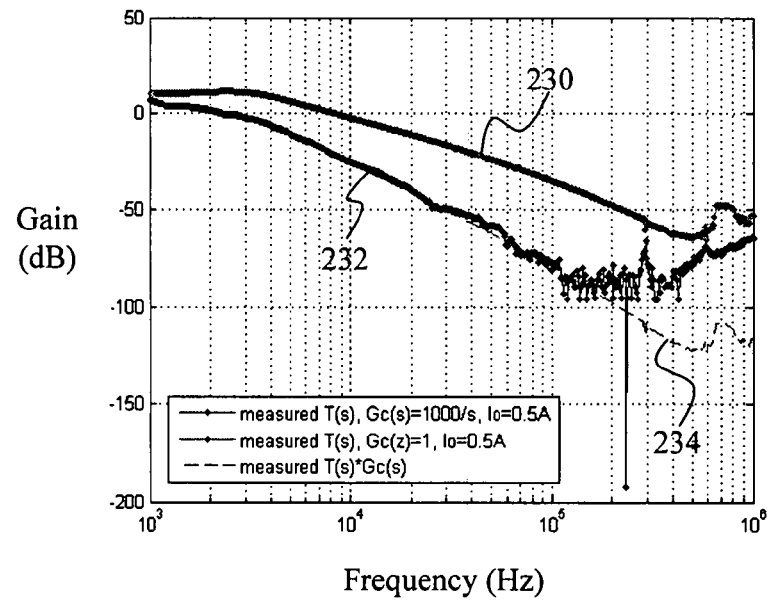
FIG. 5 is a Bode plot showing the open-loop gain of the switching mode power supply of FIG. 2 when a dominated-pole compensator is used.
Figure 6:
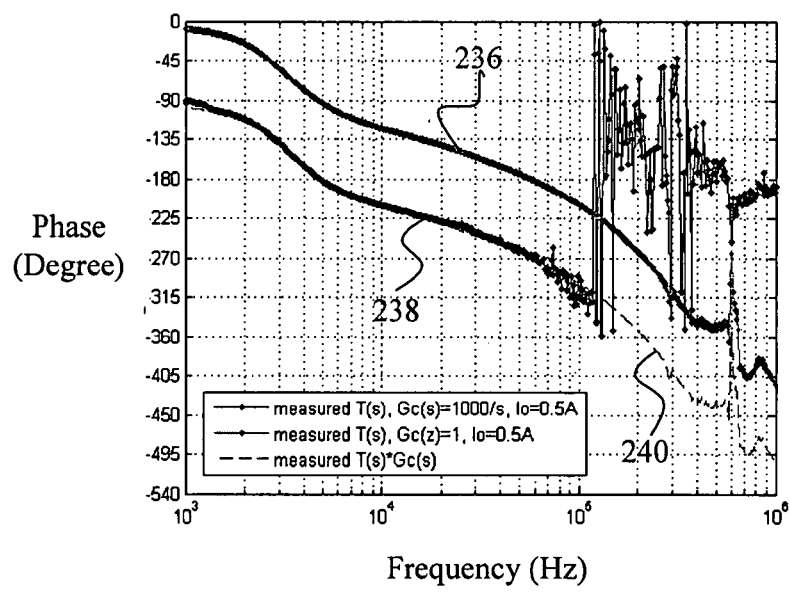
FIG. 6 is a Bode plot showing the phase margin of the switching mode power supply of FIG. 2 when a dominated-pole compensator is used.

FIGS. 5 and 6 are Bode plots to show the open-loop gain and phase margin of the switching mode power supply 200 when the compensator 208 is a dominated-pole compensator. In FIG. 5, the X-axis represents frequency (Hz), and the Y-axis represents dB value of the open-loop gain. In FIG. 6, the X-axis represents frequency (Hz), and the Y-axis represents the phase (degree). In FIGS. 5 and 6, the curves 230 and 236 represent the experiment results obtained by actually measuring the switching mode power supply 200 in the measure mode when the equivalent transfer function of the compensator 210 is equal to 1. The curves 230 and 236 are provided for a computer to design the compensator 208, and the curves 234 and 240 are the whole frequency response calculated by the designed compensator 208. Because one dominated-pole of the designed compensator 208 is at 0 Hz, i.e., the transfer function Gc(s)=A/S, where the symbol A represents the gain and is set to be 1,000, and the symbol S represents a Laplace transform operand, the estimated gain curve 234 has a −20 dB/decad decrease per $1\times10^3$–$3\times10^3$ Hz relative to the curve 230, and the estimated phase angle curve 240 has 90° less than the measured curve 236 since it has one more 0 Hz pole than the measured curve 236. From the estimated curves 234 and 240, it is shown that the unit gain frequency after compensation is about 2 kHz, and the phase margin is about 90°. The curves 232 and 238 show the gain and the phase of the switching mode power supply 200 actually measured when using the designed compensation factor in the normal mode, and by comparing the measured curves 232 and 238 with the estimated curves 234 and 240, it is shown that this method can accurately estimate and compensate the open-loop frequency response of the switching mode power supply 200.

Figure 7:
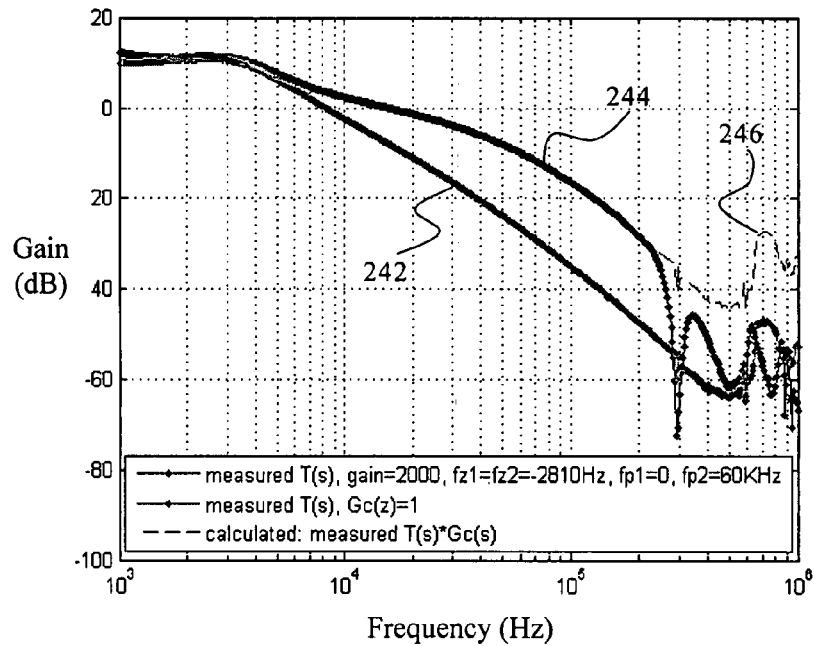
FIG. 7 is a Bode plot showing the open-loop gain of the switching mode power supply of FIG. 2 when a second-order compensator is used.
Figure 8:
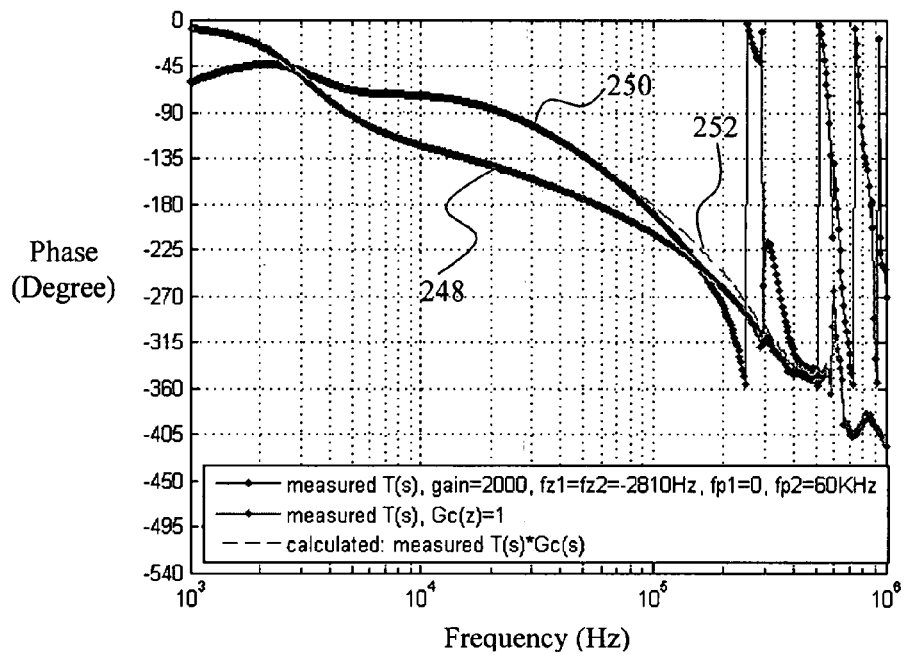
FIG. 8 is a Bode plot showing the phase margin of the switching mode power supply of FIG. 2 when a second-order compensator is used.

FIGS. 7 and 8 are Bode plots to show the open-loop gain and phase margin of the switching mode power supply 200 when the compensator 208 is a second-order compensator. In FIG. 7, the X-axis represents frequency (Hz), the Y-axis represents dB value of the open-loop gain, curve 242 represents the open-loop gain in the measure mode when the equivalent transfer function of the compensator 210 is equal to 1, curve 244 represents the open-loop gain in the normal mode when the compensator 208 has a second-order transfer function, and curve 246 represents the calculated open-loop gain. In FIG. 8, the X-axis represents frequency (Hz), the Y-axis represents phase (degree), curve 248 represents the phase margin in the measure mode when the equivalent transfer function of the compensator 210 is equal to 1, curve 250 represents the phase margin in the normal mode, and curve 252 represents the calculated phase margin. Because the designed compensator 210 eliminates the measured conjugate poles at 2,810 Hz by two zero points, the bandwidth and the phase margin of the switching mode power supply 200 are wider. In this embodiment, the bandwidth is 18 KHz, and the phase margin is 95°. By comparing the measured curves 242 and 248 with the estimated curves 246 and 250, it is shown that this method can accurately estimate and optimize the open-loop frequency response of the switching mode power supply 200.

Figure 9:
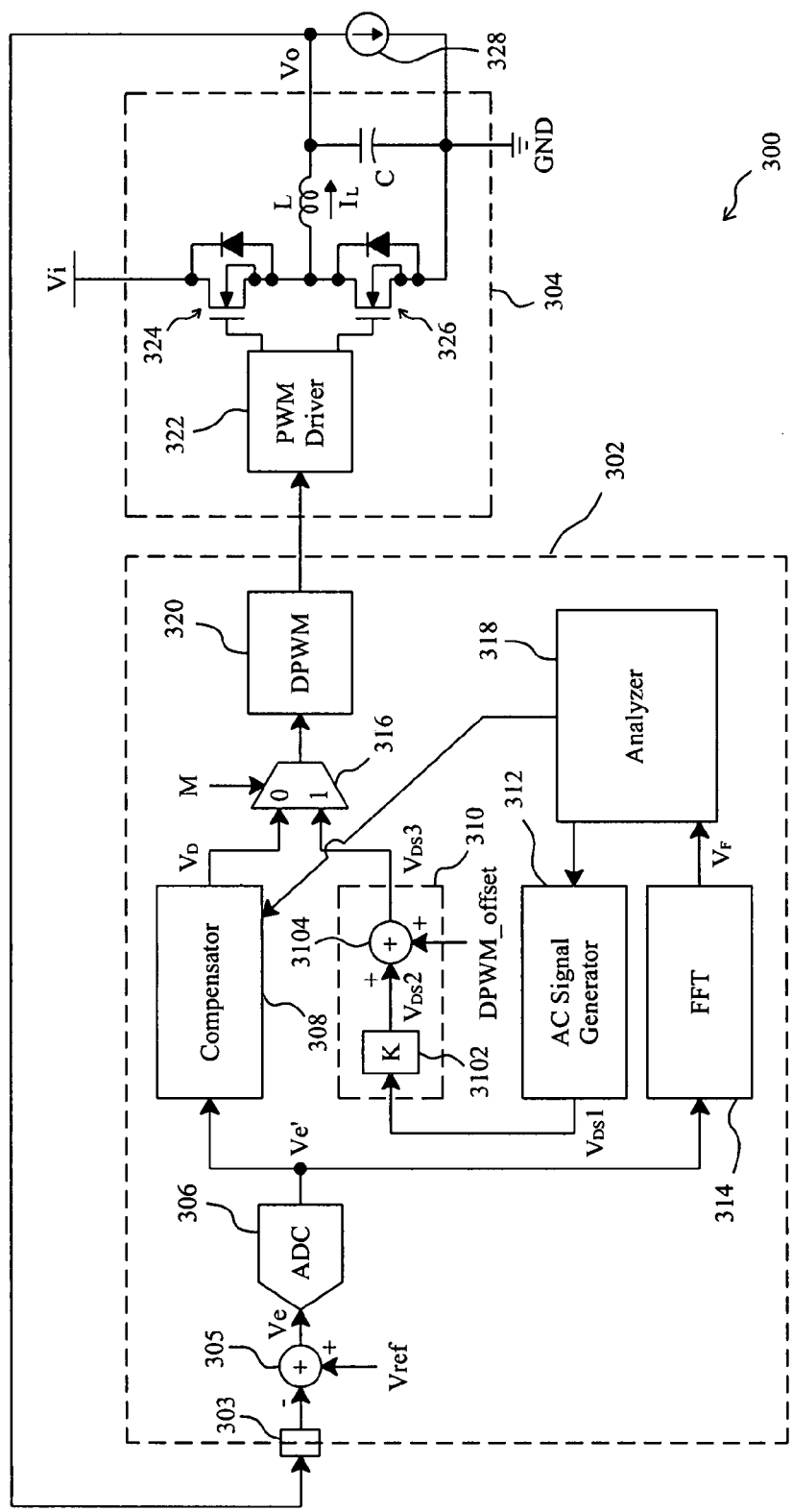
FIG. 9 shows a second embodiment according to the present invention.

FIG. 9 shows a second embodiment according to the present invention. In a digital switching mode power supply 300, a controller 302 drives an output stage 304 to produce an output voltage Vo. In the output stage 304, a driver 322 switches two power transistors 324 and 326 connected in series between a power input Vi and ground GND according to the output of the controller 302 for converting the input voltage Vi to the output voltage Vo for a load 328. In the controller 302, when in a measure mode, a multiplexer 316 connects a compensator 310 to a DPWM 320 according to a mode switching signal M, an analyzer 318 controls a small AC signal generator 312 to provide a small signal voltage $V_{DS}1$, which is a digital signal, for the compensator 310, a gain circuit 3102 in the compensator 310 amplifies the small signal voltage $V_{DS}1$ to be a digital voltage $V_{DS}2$, an adder 3104 level-shifts the digital voltage $V_{DS}2$ with an offset signal DPWM_offset which is equal to Vo/Vi, to produce a digital voltage $V_{DS}3$, the DPWM 320 drives the output stage 304 to produce the output voltage Vo according to the digital voltage $V_{DS}3$, the output voltage Vo is fed back to an error amplifier 305 of the controller 302 through a feedback pin 303, the error amplifier 305 compares the output voltage Vo with a reference voltage Vref to produce an error signal Ve, an ADC 306 converts the error signal Ve to a digital error signal Ve', a fast Fourier transformer (FFT) 314 transforms the digital error signal Ve' in time domain into a signal $V_F$ in frequency domain, and the analyzer 318 analyzes the small signal voltage $V_{DS}1$ and the signal $V_F$ to derive a frequency response of the switching mode power supply 300 to determine a compensation factor for a compensator 308 and stores the compensation factor into the compensator 308. When in a normal mode, the multiplexer 316 connects the compensator 308 to the DPWM 320 according to the mode switching signal M, the error amplifier 305 compares the output voltage Vo with the reference voltage Vref to produce an error signal Ve, the ADC 306 converts the error signal Ve into a digital error signal Ve', the compensator 308 compensates the digital error signal Ve' to produce a signal $V_D$, the DPWM 320 drives the output stage 304 according to the signal $V_D$. The switching mode power supply 300 can automatically measure the compensation factor and determine and set the optimized compensation factor for the compensator 308, without adding other signals or modifying the circuit.

Figure 10:
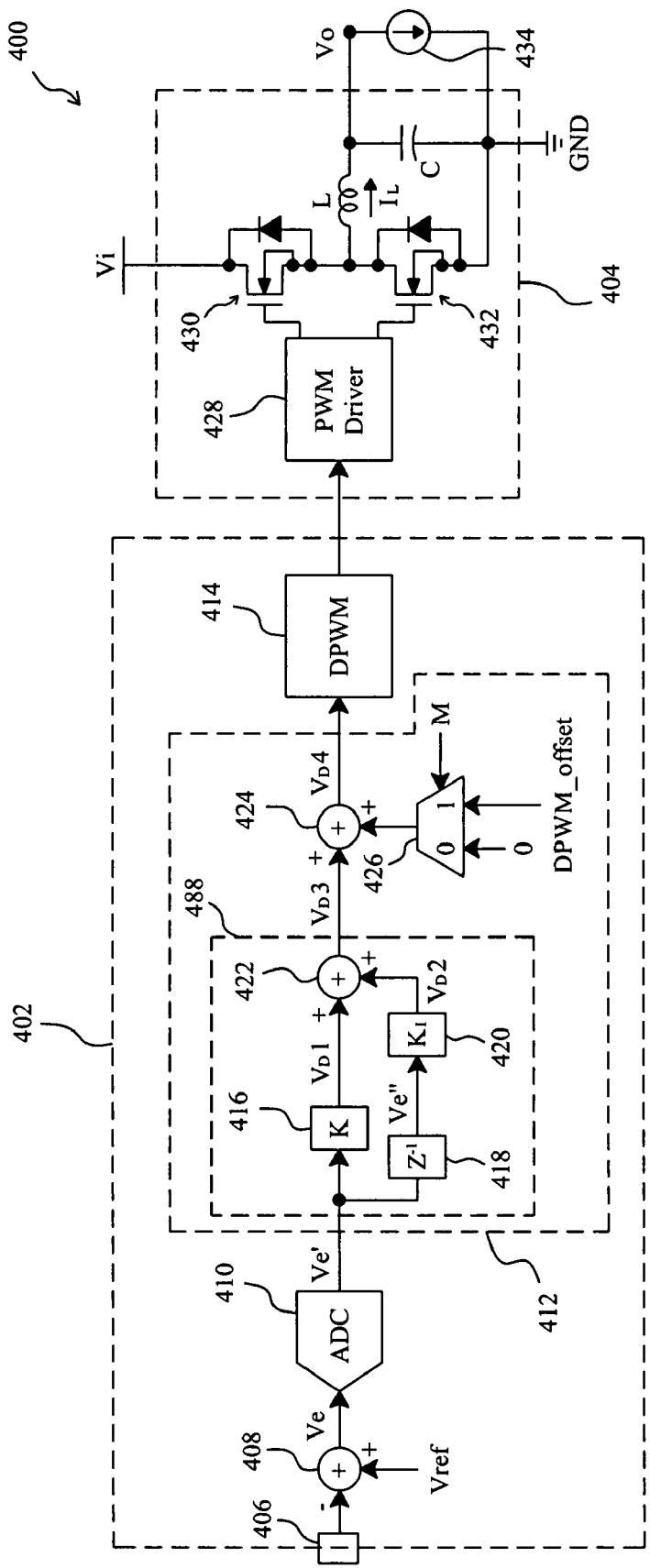
FIG. 10 shows a third embodiment according to the present invention.

FIG. 10 shows a third embodiment according to the present invention. In a switching mode power supply 400, a controller 402 drives an output stage 404 to produce an output voltage Vo. In the output stage 404, a driver 428 switches two power transistors 430 and 432 connected in series between a power input Vi and ground GND according to a PWM signal provided by the controller 402, for converting the input voltage Vi to the output voltage Vo for a load 434. In the controller 402, an error amplifier 408 has two inputs to receive a feedback signal from a feedback pin 406 of the controller 402 and a reference voltage Vref respectively, to produce an error signal Ve, an ADC 410 converts the analog error signal Ve to a digital error signal Ve', a compensator 412 produces a signal $V_D4$ according to the digital error signal Ve', and a DPWM 414 drives the output stage 404 according to the signal $V_D4$. The compensator 412 comprises a digital filter 488 for filtering the digital error signal Ve' to produce a signal $V_D3$, and a multiplexer 426 for connecting 0 or an offset signal DPWM_offset to an adder 424 according to a mode switching signal M, to be combined with the signal $V_D3$ to produce the signal $V_D4$. The digital filter 488 comprises a gain circuit 416 for amplifying the error signal Ve' to produce a signal $V_D1$, a register 418 for storing the current error signal Ve' and sourcing an error signal Ve'', a gain circuit 420 for amplifying the error signal Ve'' to produce a signal $V_D2$, and an adder 422 for combining the signals $V_D1$ with $V_D2$ to produce the signal $V_D3$.

With reference to FIG. 10, when in a measure mode, the multiplexer 426 connects the offset signal DPWM_offset to the adder 424 according to a mode switching signal M, and provides a small signal voltage to the feedback pin 406 of the controller 402, and the controller 402 drives the output stage 404 to produce the output voltage Vo according to the small signal voltage and a predetermined compensation factor of the compensator 412, so that the frequency response of the switching mode power supply 400 can be derived from the small signal voltage and the output voltage Vo, for determining an optimized compensation factor for the switching mode power supply 400 and for modifying the digital filter 488.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A switching mode power supply operative in a normal mode and a measure mode, comprising:
an output stage; and
a controller for driving the output stage to produce an output voltage;
wherein the controller compensates the switching mode power supply with a first compensation factor in the measure mode so as to measure a frequency response of the switching mode power supply for determining a second compensation factor which is used to compensate the switching mode power supply in the normal mode.

2. The switching mode power supply of claim 1, wherein the controller has a feedback pin for receiving either a small signal voltage in the measure mode or a feedback signal derived from the output voltage in the normal mode to regulate the output voltage.

3. The switching mode power supply of claim 2, wherein the controller comprises:
an error amplifier for comparing a signal from the feedback pin with a reference voltage to produce an error signal;

a compensator for compensating the error signal with either the first compensation factor in the measure mode or the second compensation factor in the normal mode, so as to produce a compensated error signal; and a pulse width modulator for driving the output stage according to the compensated error signal.

4. The switching mode power supply of claim 3, further comprising an analog-to-digital converter for digitizing the error signal.

5. The switching mode power supply of claim 3, wherein the compensator comprises:

a digital filter for filtering the error signal to produce a first signal;

an adder having a first input to receive the first signal and a second input to receive a second signal, so as to combine the first and second signals to produce a third signal; and a multiplexer for selecting a forth signal to be the second signal in the normal mode and a fifth signal to be the second signal in the measure mode.

6. The switching mode power supply of claim 5, wherein the digital filter comprises a gain circuit for amplifying the error signal, the gain circuit having a first gain in the normal mode and a second gain in the measure mode.

7. The switching mode power supply of claim 2, wherein the controller comprises:

an error amplifier for comparing a signal from the feedback pin with a reference voltage to produce an error signal;

a first compensator for compensating the error signal with the first compensation factor in the measure mode to produce a first signal;

a second compensator for compensating the error signal with the second compensation factor in the normal mode to produce a second signal; and a pulse width modulator for driving the output stage according to the first signal in the measure mode and the second signal in the normal mode.

8. The switching mode power supply of claim 7, further comprising an analog-to-digital converter for digitizing the error signal.

9. The switching mode power supply of claim 7, wherein the first compensator comprises:

a gain circuit for amplifying the error signal; and an adder having a first input to receive the amplified error signal and a second input to receive a third signal, so as to combine the amplified error signal and the third signal to produce the first signal.

10. The switching mode power supply of claim 7, further comprising a multiplexer for connecting the first signal to the pulse width modulator in the measure mode and the second signal to the pulse width modulator in the normal mode.

11. The switching mode power supply of claim 1, wherein the controller comprises:

an error amplifier for comparing the output voltage with a reference voltage to produce an error signal;

an AC signal generator for providing a small signal voltage;

a first compensator for compensating the small signal voltage with the first compensation factor in the measure mode to produce a first signal;

a second compensator for compensating the error signal with the second compensation factor in the normal mode to produce a second signal;

a pulse width modulator for driving the output stage according to the first signal or the second signal; and an analyzer for analyzing the small signal voltage and a third signal related to the error signal in the measure mode, to derive the frequency response for determining the second compensation factor.

12. The switching mode power supply of claim 11, further comprising a fast Fourier transformer for transforming the error signal to the third signal.

13. The switching mode power supply of claim 11, further comprising an analog-to-digital converter for digitizing the error signal.

14. The switching mode power supply of claim 11, further comprising a multiplexer for connecting the first signal to the pulse width modulator in the measure mode and the second signal to the pulse width modulator in the normal mode.

15. The switching mode power supply of claim 11, wherein the first compensator comprises:

a gain circuit for amplifying the small signal voltage; and an adder having a first input to receive the amplified small signal voltage and a second input to receive a fourth signal, so as to combine the amplified small signal voltage and the fourth signal to produce the first signal.

16. A method for determining a compensation factor for a switching mode power supply operative in a normal mode and a measure mode, comprising the steps of:

switching the switching mode power supply to the measure mode;

providing a small signal voltage;

driving an output stage of the switching mode power supply according to the small signal voltage and a first compensation factor, for producing an output voltage; and deriving a frequency response of the switching mode power supply from the output voltage for determining a second compensation factor which is used to compensate the switching mode power supply in the normal mode.

17. The method of claim 16, wherein the step of driving an output stage of the switching mode power supply according to the small signal voltage and a first compensation factor comprises the steps of:

comparing the small signal voltage with a reference voltage for producing an error signal;

compensating the error signal with the first compensation factor; and driving the output stage according to the compensated error signal.

18. The method of claim 17, further comprising the step of digitizing the error signal before the step of compensating the error signal with the first compensation factor.

19. The method of claim 16, wherein the step of driving an output stage of the switching mode power supply according to the small signal voltage and a first compensation factor comprises the step of:

compensating the small signal voltage with the first compensation factor; and driving the output stage according to the compensated small signal voltage.

20. The method of claim 16, wherein the step of deriving a frequency response of the switching mode power supply from the output voltage for determining a second compensation factor comprises the steps of:

comparing the small signal voltage with a reference voltage for producing an error signal;

fast Fourier transforming the error signal; and analyzing the transformed error signal and the small signal voltage to derive the frequency response.

21. The method of claim 20, further comprising the step of digitizing the error signal before the step of fast Fourier transforming the error signal.

* * * * *